US00RE37189E

(19) United States
(12) Reissued Patent
Lai

(10) Patent Number: US RE37,189 E
(45) Date of Reissued Patent: May 29, 2001

(54) JEWELRY SETTING

(75) Inventor: Danny S. Lai, New York, NY (US)

(73) Assignee: Gramercy Jewelry Manufacturing Corp., New York, NY (US)

(21) Appl. No.: 29/112,625

(22) Filed: Oct. 19, 1999

Related U.S. Patent Documents

Reissue of:
(64) Patent No.: Des. 411,134
Issued: Jun. 22, 1999
Appl. No.: 29/072,600
Filed: Jun. 20, 1997

(51) LOC (6) Cl. ..... 11-01
(52) U.S. Cl. ..... D11/91; D11/91
(58) Field of Search ..... D11/1, 2, 36, 48, D11/75–76, 86–88, 91, 92; 63/12, 13, 26, 27, 29 R, 15–15.8; 128/329

(56) References Cited

U.S. PATENT DOCUMENTS

D. 273,666 * 5/1984 Hayashi ..... D11/1
D. 275,660 * 9/1984 Carroll ..... D11/86
5,671,613 * 9/1997 Hoover et al. ..... 63/27

OTHER PUBLICATIONS

Rio Grande Albuquerque 1991–1992 Catalog p. 51—upper right of page.*

* cited by examiner

*Primary Examiner*—Ralf Seifert
(74) *Attorney, Agent, or Firm*—Baker Botts, L.L.P.

(57) CLAIM

The ornamental design for a jewelry setting, as shown and described.

DESCRIPTION

Figure 1:
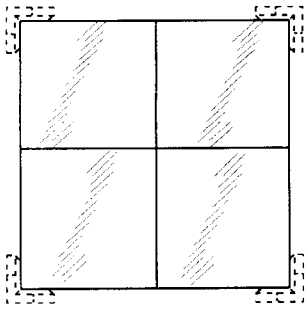
FIG. 1 is a top plan view of a jewelry setting showing my new design.
Figure 4:
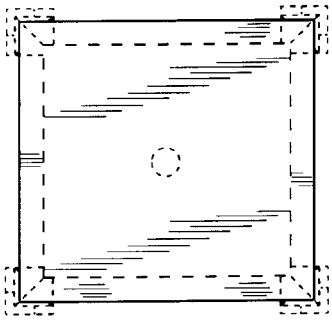
FIG. 4 is a bottom plan view of FIG. 1.
Figure 5:
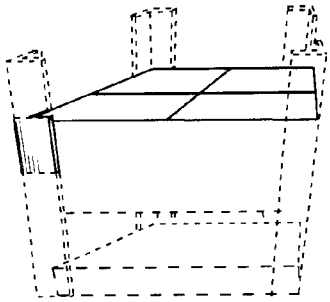
FIG. 5 is a [right side] perspective view of a jewelry setting showing a second embodiment of my new design[, the left side being a mirror image. It being understood that the bottom of FIG. 5 is plain and unornamented].
Figure 2:
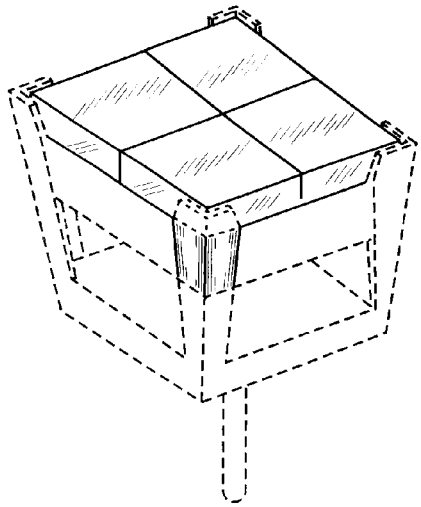
FIG. 2 is a perspective view *of FIG. 1, shown in one environment in which the design can be associated with*.
Figure 3:
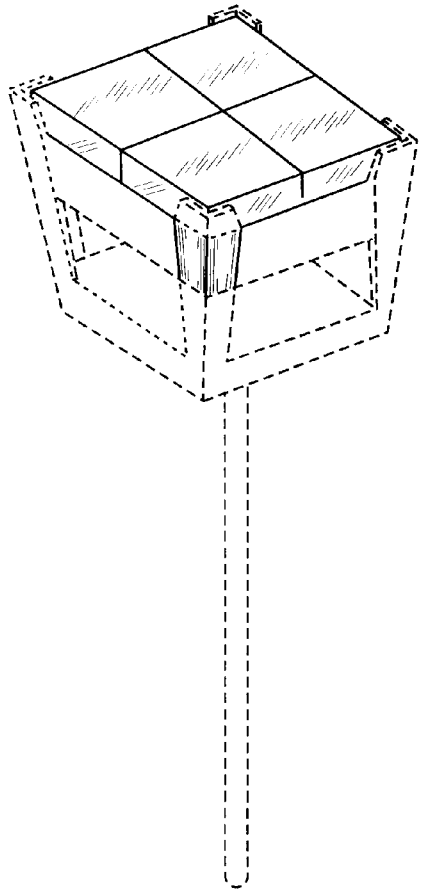
FIG. 3 is a perspective view of [a jewelry setting showing a second embodiment of my new design as it applies to an earring] *FIG. 1, shown in another environment in which the design can be associated with*.

*The broken line showing of a setting in FIGS. 1–5 is for illustrative purposes only and forms no part of the claimed design.*

1 Claim, 2 Drawing Sheets

Matter enclosed in heavy brackets [ ] appears in the original patent, but forms no part of this reissue; matter printed in italics indicates the additions made by reissue.